United States Patent
Dashner

[15] 3,692,042
[45] Sept. 19, 1972

[54] FIRE HYDRANT
[72] Inventor: James William Dashner, Elmira, N.Y.
[73] Assignee: Kennedy Valve Mfg. Co., Inc., Elmira, N.Y.
[22] Filed: Jan. 8, 1971
[21] Appl. No.: 104,992

[52] U.S. Cl. ................... 137/296, 85/70, 220/55 Y, 285/3
[51] Int. Cl. .......................................... E03b 9/06
[58] Field of Search ...... 137/272, 296, 797; 251/268, 251/269, 270; 285/2, 3, 4; 220/55 K, 55 J, 55 Y; 85/70

[56] References Cited
UNITED STATES PATENTS

| | | | |
|---|---|---|---|
| 3,475,978 | 11/1969 | Dunton | 74/89.15 |
| 2,771,096 | 11/1956 | Ver Nooy | 138/89 |
| 2,797,948 | 7/1957 | Tangard | 292/144 |

*Primary Examiner*—Alan Cohan
*Assistant Examiner*—Richard Gerard
*Attorney*—H. Edward Foerch

[57] ABSTRACT

A fire hydrant having an improved means for securing a cover plate to the upper standpipe section of the hydrant. The cover plate rests on the upper surface of the upper standpipe section and has an annular flange which projects into the upper standpipe section and against the inner surface thereof to form an annular cavity and to limit relative lateral movement. Shear pins are positioned in special bores in top of the upper standpipe section and extend into the cavity where they limit movement of the cover plate axially away from the upper standpipe section. A compressed resilient washer seals and secures each shear pin in its bore.

5 Claims, 5 Drawing Figures

PATENTED SEP 19 1972

3,692,042

INVENTOR
JAMES W. DASHNER
BY
ATTORNEY

FIRE HYDRANT

BRIEF SUMMARY OF THE INVENTION

Conventional fire hydrants include a tubular upper standpipe section having fire hose connections through which water flows from the underground mains. A cover plate conventionally closes the top of the upper standpipe section and provides a mounting base for the operating stem nut for the hydrant stem.

In the past, the cover plate has been connected either by a flange which is bolted to a mated flange on the upper standpipe section or by threads on the cover plate which connect with threads on the upper standpipe section, as shown in U.S. Pat. No. 3,475,978.

In accordance with the present invention, an improved hydrant is provided in which the cover plate rests on the upper end surface of the upper standpipe section and has an annular flange which projects into the end of the upper standpipe section, and has a radially outward extending end portion to form an annular cavity. Shear pins are positioned in special bores provided therefor through the upper end of the upper standpipe section to extend into the annular cavity.

The end portion of the flange which is below the shear pins has a cylindrical outer surface which is closely adjacent to the inner cylindrical surface of the upper standpipe section to prevent lateral movement of the cover plate relative to the upper standpipe section, and it has a radially extending surface which is adjacent to and below the shear pins to prevent movement of the cover plate away from the upper standpipe section. A groove in the cylindrical surface with an O-ring therein provides a fluid seal between the flange of the cover plate and the inner surface of the upper standpipe section.

A further feature of the shear pin is means for sealing and securing a shear pin in the standpipe bore. Each shear pin has a tapped bore which is formed axially from its outer end surface to receive a screw. A resilient washer is positioned on the screw and against the outer circular surface and in the outer end of the bore. When the screw is tightened, it forces the resilient washer against the surface of the shear pin and causes the washer to expand and compress against the surface of the tapped bore to secure and seal the shear pin in the standpipe bore. Loosening of the screw causes the resilient washer to relax and permits easy removal of the shear pin.

This improved hydrant has advantages over a prior hydrant having a flanged connection by permitting a reduction of the height of the upper standpipe section above the outlet connections to provide a streamlined appearance and to provide a saving of material; and it has an advantage over a threaded connection by eliminating the need for a large special wrench to thread or unthread the cover plate to the upper standpipe section.

Accordingly, a principal object of the present invention is to provide a fire hydrant having an improved means for connecting the cover plate to the upper standpipe section of the hydrant.

Another object is to provide a cover plate having a flange which extends into the end of the upper standpipe section of a hydrant to cooperate with the inner surface of the upper standpipe section and with shear pins to secure the cover plate to the upper standpipe section by preventing axial movement thereof away from the upper standpipe section.

Another object is to provide a simple and reliable means for securing and sealing the shear pin in the standpipe bore.

Other objects will appear hereinafter.

The best modes in which I have contemplated applying the principles of the present invention are shown in the accompanying drawings but these are to be deemed primarily illustrative for it is intended that the claims shall cover by suitable expression in the appended claims whatever of patentable subject matter resides in the invention disclosed.

Figure 1:
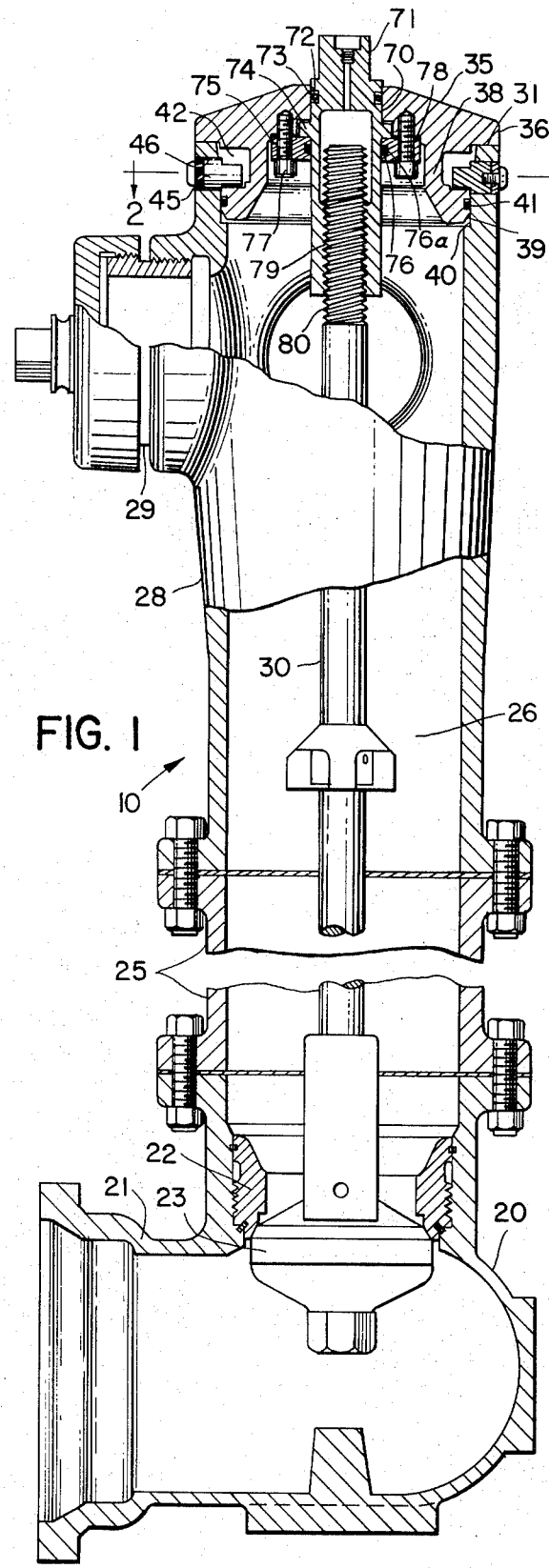
FIG. 1 is a side elevation, sectional view of a hydrant in accordance with the invention.

Referring more particularly to FIG. 1, a fire hydrant 10 is shown and comprises a conventional elbow valve 20 for connection to an underground water system, not shown. The valve 20 includes a body member 21, a valve seat ring 22 and a valve member 23. A lower standpipe section 25 of the hydrant, having a central fluid passage, is connected to the top of the valve body 21 by flanges. An upper standpipe section 28 having a central fluid passage is connected to the lower section 25 by flanges. Conventional fire hose connections 29 near the upper end of the upper standpipe section 28 communicate with the central fluid passage 26. The upper standpipe section 28 extends beyond the fire hose connections 29 for a relatively short distance and terminates with an annular surface 31 which is substantially perpendicular to the axis of the upper standpipe section.

A cover plate 35 rests on the surface 31 of the upper standpipe section 28 to close the end of the central fluid passage 26. The cover plate 35 may be cast and includes a top portion 36 which has a diameter substantially equal to the diameter of the outer cylindrical surface of the upper standpipe section 28. The upper surface of the top portion 36 is shaped for drainage and for appearance.

The cover plate 35 further includes an annular flange 38 which projects from the lower surface of the top portion 36 into the upper end of the fluid passage 26. A portion of the flange 38 is spaced from the inner surface of the upper standpipe section and an end portion of the flange has a cylindrical surface 39 which is positioned closely adjacent to an inner surface 40 of the upper standpipe portion 28. A groove 50 in the surface 39 receives an O-ring 41 to provide a fluid seal between the cover plate 35 and the inner surface of the upper standpipe section 28. The end portion of the flange 38 has a radially extending surface 48 which faces toward the top of the hydrant. The flange 38, including the surface 48, cooperates with the top portion 36 and with the inner surface 40 of the upper standpipe section 28 to form an annular chamber 42.

Figure 2:
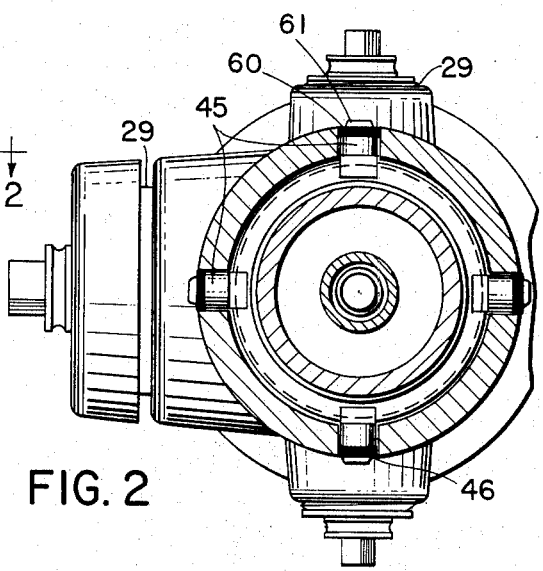
FIG. 2 is a sectional view taken along line 2—2 of FIG. 1.

Novel securing means are provided to secure the cover plate 35 to the upper standpipe section 28 against fluid forces present within the hydrant during use. The securing means comprise shear pins 45 which are positioned in bores 46. The bores 46 are formed in the upper standpipe section 28 by boring radially through the upper end thereof. The bores 46 are formed at a distance below the surface 31, such that when the cover plate 35 is positioned on the surface 31 the bores 46 communicate with the cavity 42; however, a projection of the bore 46 against the flange 38 includes the upper edge of the surface 39. While any suitable number of bores 46 may be provided around the circumference of the hydrant, four bores 46 and four shear pins 45 are shown equally spaced (FIG. 2) about the circumference of the upper standpipe section 28.

Figures 4, 5:
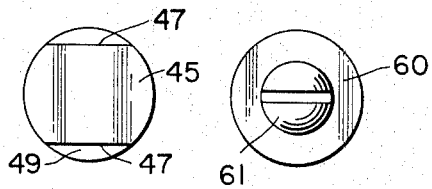
FIG. 4 is an end view of the shear pin of FIG. 3.
FIG. 5 is an end view of the other end of the shear pin showing the retaining and sealing means of the shear pin of FIG. 3.
Figure 3:
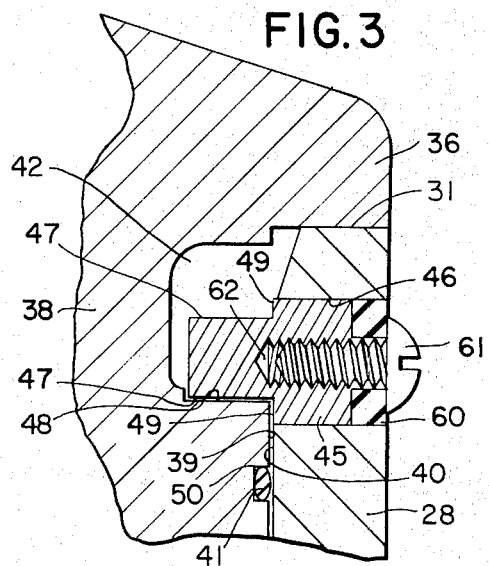
FIG. 3 is an enlarged view of the shear pin connection of FIG. 1.

As seen in FIGS. 3, 4 and 5, the shear pins 45 are generally cylindrical, however, at least one segment is removed along the inner end of the shear pins. The shear pins may be formed, for example, from a bar of seven-eighths inch cold roll steel. At one end of the cut pieces, at least one segment, which has a thickness at least equal to the length of the surface 39 which is exposed by the bore 46, is removed in any convenient manner to form a bearing surface 47. The bearing surface 47 lies parallel to the axis of the shear pin and terminates with a surface 49 which is perpendicular to the axis of the shear pin. The shear pins 45 are shown in FIGS. 3 and 4 with two parallel bearing surfaces 47, merely to increase the ease of positioning the shear pin in the bore 46 with a correct orientation, that is, with one bearing surface 47 adjacent to and engaging the annular surface 48. When positioned in the bore 46, the shear pin 45 extends into the cavity 42 and the surface 49 engages the surface 39 to limit inward travel of a shear pin 45. The axial length of the portion of the shear pin 45 in the bore 46 is less than the wall thickness of the upper standpipe section 28.

Means are provided for sealing the outer end of a bore 46 and for securing a shear pin 45 in the bore 46. These sealing and securing means preferably comprise a screw 61 which is threaded into an axial, tapped bore 62 in the shear pin 45 and comprise a washer 60 which is made of a resilient material. The washer 60 is positioned on the screw 61 against the end of the shear pin 45. The thickness and diameter of this resilient washer 60 are such that the washer easily fits into and approximately fills the outer portion of the bore 46 between the end of the shear pin 45 and the outer surface of the upper standpipe section 28 when the resilient washer is in a relaxed condition.

When the screw 61 is tightened sufficiently to compress the resilient washer 60 between the end of the shear pin 45 and the head of the screw 61, the resilient washer 60, being noncompressible, will expand radially against the surface of the bore 46 and it will flow outwardly around the head of the screw 61. In doing so, the resilient material will completely fill and seal the end of the bore 46 and it will grip the surface of the bore 46 sufficiently to secure the shear pin 45 in the bore 46. Paint, moisture and other foreign materials cannot enter to accumulate in the bore 46.

When the screw 61 is loosened, the resilient material of washer 60 will relax. The entire shear pin assembly, including the screw 61, the washer 60 and the shear pin 45, may be removed from the bore 46 by grasping the loosened screw 61 and pulling outwardly.

The cover plate 35 further includes an axial opening 70 in which a stem nut 71 is positioned for rotary movement. The stem nut 71 has a groove 72 in its outer cylindrical surface. An O-ring 73 is positioned in the groove 72 to provide a weather seal.

The stem nut 71 has an annular flange 74 which projects radially outward from the cylindrical surface of the nut 71 into a recess provided therefor in the cover plate 35. One radial surface of the flange 74 is positioned against a cooperating surface of the recess to restrain axial movement of the stem nut in an outward direction. Axial movement of the stem nut 71 in an inward direction is restrained by a plate 75 which is positioned on the inner side of the cover plate 35 and against the lower surface of the flange 74. Bolts 77 pass through suitable holes in the plate 75 and engage the threads of tapped holes in the cover plate 35 to secure the plate 75 in place. Thus, the stem nut 71 may be rotated, but it is held against axial movement. A fluid seal is provided between the stem nut 71 and the flange 74 by an O-ring 76 in a groove 76a which is formed in the nut plate 75. A gasket 78 is clamped between the nut plate 75 and the cover plate 35 by the bolts 77.

A valve stem 30 is positioned in the fluid passages of the upper and lower standpipe sections 28 and 25 to connect the valve member 23 to the stem nut 71. Threads 80 on the upper end of the stem 30 engage threads 79 of the stem nut 71. Rotation of the stem nut 71 raises or lowers the stem 30 to close or open the valve. 20.

Should it be necessary to disassemble the hydrant, the hydrant valve member 23 is closed. The shear pins 45 may be removed by loosening the screws 61 and pulling on them to remove each shear pin from its bore 46. The stem nut 71 is then rotated in a direction to unthread it from the stem 30. This will carry and remove cover plate 35, the hydrant may be further disassembled in a conventional way, if desired. To reassemble the hydrant, the stem nut 71 with cover plate 35 attached is threaded onto the stem 30 until the top portion 36 engages the surface 31 of the upper section 28. As there are no holes to line up and as the bearing surface 48 is annular, each shear pin 45 can be positioned quickly in a bore 46 with a bearing surface 47 engaging the surface 48. Tightening the screw 61 expands the resilient washer 60 to seal and secure the shear pins 45 in the bores 46.

It will be appreciated that modification may be made to the shear pin 45 and to the sealing and securing means within the scope of my invention. For example, the sealing and securing means may comprise a plug threadedly positioned in the bore 46 which is suitably tapped to receive the plug.

Further, while my invention has been described with reference to a "wet top" hydrant, that is, a hydrant in which the operating threads are exposed to water within the hydrant, it is equally applicable and will provide all of the herein described advantages when embodied in a "dry top" hydrant, provided the cover plate includes a flange having a radially extending surface against which a bearing surface of a shear pin can be positioned thereby to prevent axially movement of the cover plate away from the upper section of the hydrant.

The terms "upper," "lower" and "top" have been used herein to simplify the recitation and description of the relationship of the parts of my invention with reference to the drawings and are not intended to be limiting thereof.

I claim:

1. A fire hydrant comprising, a standpipe section having a fire hose connection adjacent to an end portion of said standpipe section, said end portion presenting an annular end surface and having a radial bore formed in the wall thereof, a cover plate positioned on said end surface for closing the end opening of said end portion, and annular flange integral with said cover plate and projecting into the central passage of said end portion, said flange portion having a radial outer surface including a first cylindrical surface portion spaced from the inner cylindrical wall of said end portion, a second cylindrical surface portion closely adjacent to said inner cylindrical wall of said end portion and a radially extending surface portion connecting said first and second cylindrical surface portions, said first cylindrical surface portion and said radially extending surface portion cooperating with adjacent surfaces of said cover plate and said end portion to form an annular cavity, a shear pin positioned in said radial bore and extending into said cavity to engage said radially extending surface portion of said flange for securing said cover plate on said annular surface, a resilient washer positioned in an outer end portion of said radial bore adjacent an end surface of said shear pin, and a screw positioned in said outer end portion of said radial bore adjacent a surface of said washer and threadedly engaging said shear pin, said screw compressing said resilient washer against said shear pin to expand said washer into frictional engagement with the wall of said bore, thereby sealing and securing said shear pin therein.

2. A fire hydrant according to claim 1, wherein an annular groove is provided in said second cylindrical surface portion of said flange, and an O-ring is positioned in said groove and engaging the inner cylindrical surface of said end portion to form a fluid seal therebetween.

3. A fire hydrant including a standpipe section and a fire hose connection formed therein having means for securing a cover plate to said standpipe section, said standpipe section having an open end portion adjacent to said fire hose connection presenting an annular end surface and having a radial bore formed through the wall thereof, comprising:

a cover plate formed with an annular flange positioned on said end surface and closing the end opening of said end portion, said annular flange projecting into said end opening of said end portion and having an outer surface which cooperates with adjacent surfaces of said cover plate and said end portion to form an annular cavity;

a shear pin positioned in said radial bore and projecting into said annular cavity for engaging said flange surface to restrain movement of said cover plate in an axial direction away from said end surface;

a resilient washer positioned in an outer end portion of said radial bore adjacent an end surface of said shear pin; and clamping means positioned in said outer end portion of said radial bore adjacent a surface of said washer, said clamping means arranged to compress said washer against said end surface of said shear pin to cause said washer to expand radially and to frictionally engage the wall of said radial bore, thereby sealing and securing said shear pin therein.

4. A fire hydrant as described in claim 3, wherein said shear pin comprises a cylindrical portion within said bore and a portion having a flat bearing surface which engages a radially-extending portion of said flange outer surface.

5. A fire hydrant as described in claim 3, wherein said clamping means comprises a screw threadedly engaging said shear pin and passing through said resilient washer, whereby tightening said screw expands said resilient washer.

* * * * *